H. CROWELL.
Cranberry-Rake.
No. 210,599. Patented Dec. 10, 1878.
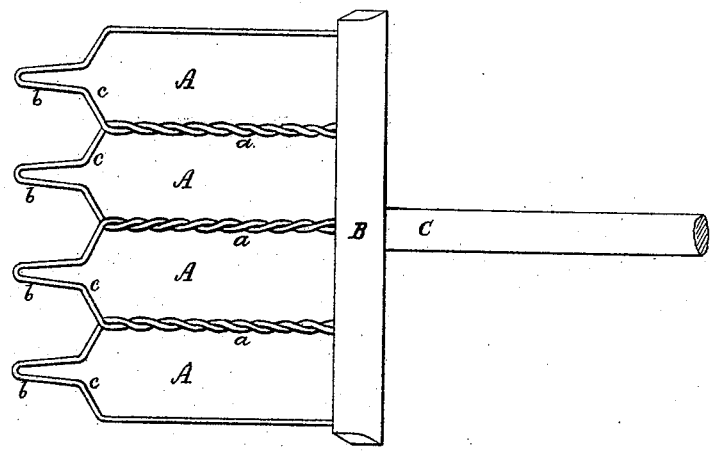
Witnesses.
S. N. Piper
John R. Snow
Inventor.
Hiram Crowell.
by his attorney.
R. H. Eddy

UNITED STATES PATENT OFFICE.

HIRAM CROWELL, OF WEST SANDWICH, MASSACHUSETTS.

IMPROVEMENT IN CRANBERRY-RAKES.

Specification forming part of Letters Patent No. 210,599, dated December 10, 1878; application filed July 19, 1878.

*To all whom it may concern:*

Be it known that I, HIRAM CROWELL, of West Sandwich, of the county of Barnstable, of the State of Massachusetts, have invented a new and useful Improvement in Cranberry-Rakes; and do hereby declare the same to be described in the following specification, and represented in the accompanying drawing, which is a top view of a rake of my improved kind.

Its teeth are a series of double-arched wires or bows, A A, &c., inserted or fixed at their ends in or to a bar or head, B, provided with a handle, C. Previous to being fixed in the said head the several wires or teeth are connected by being twisted together in manner as shown at *a a*, whereby the part of the rake made by them is rendered stiffer and stronger laterally and longitudinally than would be the case were the double-arched teeth fixed in the head without being so joined to each other. The two arches of each tooth are shown at *b* and *c*, the lesser one, *b*, opening into the greater, *c*, in manner as represented.

In using this rake, it is to be pressed down and drawn backward upon the cranberry-vines, so as to cause the berries thereof to pass up through the openings of the teeth, and the stems to be drawn into the lesser arches, which will strip the berries from the vines during the rearward movement of the rake.

I claim as my invention—

1. A cranberry-rake having each of its teeth a double-arched bow, essentially as represented.

2. A cranberry-rake having its teeth composed of double-arched bows, arranged and twisted together, and applied to a head or bar, substantially as set forth.

HIRAM CROWELL.

Witnesses:
    C. H. BURGESS, 2d,
    H. M. BURGESS.